(12) United States Patent
Thompson et al.

(10) Patent No.: US 11,511,401 B2
(45) Date of Patent: Nov. 29, 2022

(54) FLEX JOINT LOCK BUTTON

(71) Applicant: Snap-on Incorporated, Kenosha, WI (US)

(72) Inventors: Christopher D. Thompson, Franklin, WI (US); David T. Ross, Antioch, IL (US)

(73) Assignee: Snap-on Incorporated, Kenosha, WI (US)

( * ) Notice: Subject to any disclaimer, the term of this patent is extended or adjusted under 35 U.S.C. 154(b) by 205 days.

(21) Appl. No.: 16/554,718

(22) Filed: Aug. 29, 2019

(65) Prior Publication Data

US 2021/0060742 A1 Mar. 4, 2021

(51) Int. Cl.
*B25B 23/00* (2006.01)
*F16C 11/10* (2006.01)

(52) U.S. Cl.
CPC .......... *B25B 23/0028* (2013.01); *F16C 11/10* (2013.01)

(58) Field of Classification Search
CPC ..... B25B 23/0028; F16C 11/10; B25G 1/063; B25G 1/066
USPC ........................................ 81/52, 177.8, 177.9
See application file for complete search history.

(56) References Cited

U.S. PATENT DOCUMENTS

| | | | | |
|---|---|---|---|---|
| 3,186,265 A | * | 6/1965 | Wenturine | B25B 13/463 81/177.9 |
| 4,463,632 A | * | 8/1984 | Parke | B25G 1/063 403/93 |
| 5,199,335 A | * | 4/1993 | Arnold | B25G 1/063 81/177.8 |
| 5,419,221 A | * | 5/1995 | Cole | B25B 13/461 81/177.8 |
| 5,775,184 A | | 7/1998 | Cole | |
| 5,820,288 A | * | 10/1998 | Cole | B25G 1/063 81/177.8 |
| 5,862,723 A | * | 1/1999 | Rowlands | B25G 1/063 81/177.85 |

(Continued)

FOREIGN PATENT DOCUMENTS

| | | |
|---|---|---|
| CN | 2734433 Y | 10/2005 |
| CN | 101306531 A | 11/2008 |

(Continued)

OTHER PUBLICATIONS

UK Combined Search and Examination Report for Application No. GB2012424.4, 7 pages.

(Continued)

*Primary Examiner* — Joseph J Hail
*Assistant Examiner* — Jonathan R Zaworski
(74) *Attorney, Agent, or Firm* — Seyfarth Shaw LLP

(57) ABSTRACT

A button lock that selectively retains the angle of an object relative to a handle. The button lock is rotatable between an engaged position, where the angle is retained, and a disengaged position, where the object is disengaged from the handle and can pivotally move about the handle to change the angle. In the engaged position, button teeth on the button engage with handle teeth on the handle. In the disengaged position, the button teeth disengage the handle teeth to space the button from the handle and therefore allow free movement of the handle about the button. The button therefore quickly and easily retains the angle between the object and the handle.

27 Claims, 8 Drawing Sheets

(56) References Cited

U.S. PATENT DOCUMENTS

| | | | | |
|---|---|---|---|---|
| 6,101,907 | A * | 8/2000 | McGovern | B25B 13/461 81/177.8 |
| 6,131,490 | A * | 10/2000 | Lee | B25B 13/461 81/177.2 |
| 6,138,533 | A * | 10/2000 | Turtle | B25G 1/063 81/177.2 |
| 6,167,787 | B1 * | 1/2001 | Jarvis | B25B 23/0021 81/177.8 |
| 6,220,125 | B1 * | 4/2001 | Lan | B25G 1/063 403/93 |
| 6,295,898 | B1 * | 10/2001 | Hsieh | B25G 1/063 81/177.8 |
| 6,324,947 | B2 | 12/2001 | Jarvis | |
| 6,336,383 | B1 * | 1/2002 | Hung | B25G 1/063 81/177.2 |
| 6,382,058 | B1 * | 5/2002 | Owoc | B25G 1/007 81/177.8 |
| 6,450,067 | B1 * | 9/2002 | Liao | B25G 1/085 81/62 |
| 6,557,442 | B1 * | 5/2003 | Owoc | B25G 1/063 81/177.8 |
| 6,729,209 | B1 * | 5/2004 | Chen | B25B 13/463 81/177.9 |
| 6,877,404 | B2 * | 4/2005 | Chen | B25G 1/063 81/177.9 |
| 6,886,429 | B1 * | 5/2005 | Lee | B25B 13/461 81/177.8 |
| 6,895,839 | B1 * | 5/2005 | Hsien | B25G 1/063 81/177.8 |
| 7,082,862 | B2 * | 8/2006 | Lee | B25G 1/063 81/177.85 |
| 7,104,165 | B2 * | 9/2006 | Chu | B25G 1/063 81/177.85 |
| 7,165,480 | B2 * | 1/2007 | Lin | B25G 1/063 81/177.9 |
| 7,174,815 | B1 * | 2/2007 | Hsieh | F16C 11/10 81/177.8 |
| 7,201,085 | B1 * | 4/2007 | Hsieh | B25G 1/063 81/177.1 |
| 7,318,366 | B2 * | 1/2008 | Lee | B25B 13/46 81/177.8 |
| 7,373,861 | B2 * | 5/2008 | Hsieh | B25G 1/063 403/93 |
| 7,415,911 | B2 * | 8/2008 | Cole | B25G 1/06 81/177.8 |
| 7,451,673 | B1 | 11/2008 | Petersen | |
| 7,509,893 | B2 * | 3/2009 | Wu | B25B 13/08 81/177.8 |
| 7,682,099 | B2 * | 3/2010 | Cole | B25G 1/06 81/58.3 |
| 8,028,607 | B2 | 10/2011 | Lee et al. | |
| 8,245,604 | B2 * | 8/2012 | Chen | B25B 23/0028 81/177.8 |
| 8,276,485 | B1 * | 10/2012 | Chen | B25B 23/0028 81/177.85 |
| 8,413,553 | B2 * | 4/2013 | Chen | B25G 1/063 81/177.8 |
| 8,474,350 | B2 | 7/2013 | Lee et al. | |
| 8,695,459 | B2 | 4/2014 | Lee et al. | |
| 9,452,515 | B2 * | 9/2016 | Lee | B25B 13/463 |
| 9,975,222 | B2 * | 5/2018 | Yang | B25B 23/0028 |
| 10,532,448 | B2 * | 1/2020 | Huddy | B25G 1/066 |
| 2002/0092387 | A1 * | 7/2002 | Lee | B25G 1/063 81/177.8 |
| 2004/0177731 | A1 * | 9/2004 | Chen | B25G 1/063 81/177.8 |
| 2005/0274234 | A1 * | 12/2005 | Lee | B25B 13/461 81/177.8 |
| 2007/0169590 | A1 | 7/2007 | Charles | |
| 2007/0204727 | A1 * | 9/2007 | Lee | B25B 13/461 81/177.9 |
| 2007/0251357 | A1 * | 11/2007 | Hsieh | B25G 1/063 81/177.8 |
| 2009/0217789 | A1 * | 9/2009 | Chang | B25B 23/0028 81/60 |
| 2011/0017028 | A1 * | 1/2011 | Kuo | B25G 1/063 81/177.8 |
| 2012/0006159 | A1 * | 1/2012 | Liou | B25B 13/06 81/177.8 |
| 2014/0033877 | A1 * | 2/2014 | Lee | B25B 23/0028 81/177.8 |
| 2015/0013503 | A1 | 1/2015 | Lee et al. | |
| 2016/0008970 | A1 * | 1/2016 | Ho | B25G 1/066 81/177.8 |
| 2017/0072542 | A1 | 3/2017 | Eldessouky | |
| 2019/0015958 | A1 * | 1/2019 | Buchanan | B25B 13/462 |
| 2021/0114188 | A1 * | 4/2021 | Ross | B25B 13/462 |

FOREIGN PATENT DOCUMENTS

| | | | | |
|---|---|---|---|---|
| CN | 102756349 A | | 10/2012 | |
| DE | 3023882 | | 1/1982 | |
| DE | 102010036834 A1 * | | 2/2012 | ......... B25B 23/0071 |
| DE | 102010036834 B4 * | | 2/2012 | ......... B25B 23/0071 |
| DE | 102011002465 A1 * | | 7/2012 | ............ B25G 1/063 |
| EP | 1004403 A2 | | 5/2000 | |
| EP | 1533081 A1 | | 5/2005 | |
| TW | 201236821 A1 | | 9/2012 | |
| TW | M454897 | | 6/2013 | |
| TW | 201343339 A | | 11/2013 | |

OTHER PUBLICATIONS

Examination Report. No. 1 for corresponding Australian Application No. 2020213384 dated Jul. 9, 2021, 4 pages.

Chinese Office Action for corresponding Application No. 202010852211.3 dated Dec. 16, 2021, 9 pages.

Examination Report for corresponding Application No. GB2012424.4 dated Sep. 15, 2021, 6 pages.

Taiwan Office Action for corresponding Application No. 109129051 dated Oct. 13, 2021, 5 pages.

Canadian Office Action for corresponding Application No. 3,091,200 dated Oct. 21, 2021, 4 pages.

Examination Report No. 2 for corresponding Application No. 2020213384 dated Feb. 21, 2022, 3 pages.

UK Combined Search and Examination Report for corresponding Application No. GB2012424.4, dated Jan. 22, 2021, 7 pages.

* cited by examiner

FLEX JOINT LOCK BUTTON

TECHNICAL FIELD OF THE INVENTION

The present invention relates generally to button locks. More particularly, the present invention relates to a button lock for a flex joint torque application wrench, such as, for example, a ratchet wrench or breaker bar.

BACKGROUND OF THE INVENTION

Flex head torque application wrenches, such as, for example, ratchet wrenches or breaker bars, are a popular tool for fastening work pieces in hard to reach places. The flex head allows the head of the wrench to pivot about a flex joint and to be selectively retained against the handle. The user can thus operate the ratchet wrench with a desired angle between the head and handle of the wrench to allow easier access to a work piece.

Existing flex head ratchet wrenches include various different forms of flex joints. For example, some existing wrenches incorporate a lock button into the handle of the tool. Other designs are difficult to manufacture or allow dirt to enter and jam the button lock.

SUMMARY OF THE INVENTION

The present invention broadly comprises a button lock for a flex head torque application wrench or any other object that allows quick and easy retaining of the handle about the head. The button lock is rotatable between an engaged position, where button teeth disposed on the button meshingly engage with handle teeth on the handle, thus locking the head relative to the handle; and a disengaged position, where the button teeth are removed from the handle teeth to provide a gap between the button and handle and therefore allow free movement of the handle about the button, and thus relative movement between the head and the handle. In this manner, the button can act as a quick and easy mechanism for selectively adjusting the head at a desired angle relative to the handle, thus allowing easier accessibility and torque application to a work piece.

In particular, the present invention broadly comprises a torque application tool including a handle having handle teeth at an end thereof, a head pivotably coupled to the handle, and a button located within the head to selectively retain the angle of the head relative to the handle. The button includes a button base with button teeth disposed around a first part of an outer circumference of the button base and a clearance portion disposed adjacent to the button teeth and disposed around a second part of the outer circumference of the button base. The button teeth are selectively engageable with the handle teeth to retain the angle of the head relative to the handle based on user selection of the button.

The present invention further broadly comprises a torque application tool including a handle having handle teeth at an end thereof, a head pivotably coupled to the handle, and a button selectively retaining the angle of the head relative to the handle. The button includes a button base with button teeth disposed around at least a first part of an outer circumference of the button base and a clearance portion disposed adjacent to the button teeth and disposed around a second part of the outer circumference of the button base. The button teeth are selectively engageable with the handle teeth to retain the angle of the head relative to the handle based on user selection of the button.

The present invention also broadly comprises a button lock configured to selectively retain the angle of a handle with handle teeth relative to an object. The button lock includes a button base having a circular cross section, button teeth disposed around part of an outer circumference of the button base, and a clearance adjacent to the button teeth and disposed around part of the outer circumference of the button base. The button teeth are selectively engageable with the handle teeth to retain the angle of the handle relative to the object based on user selection of the button.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
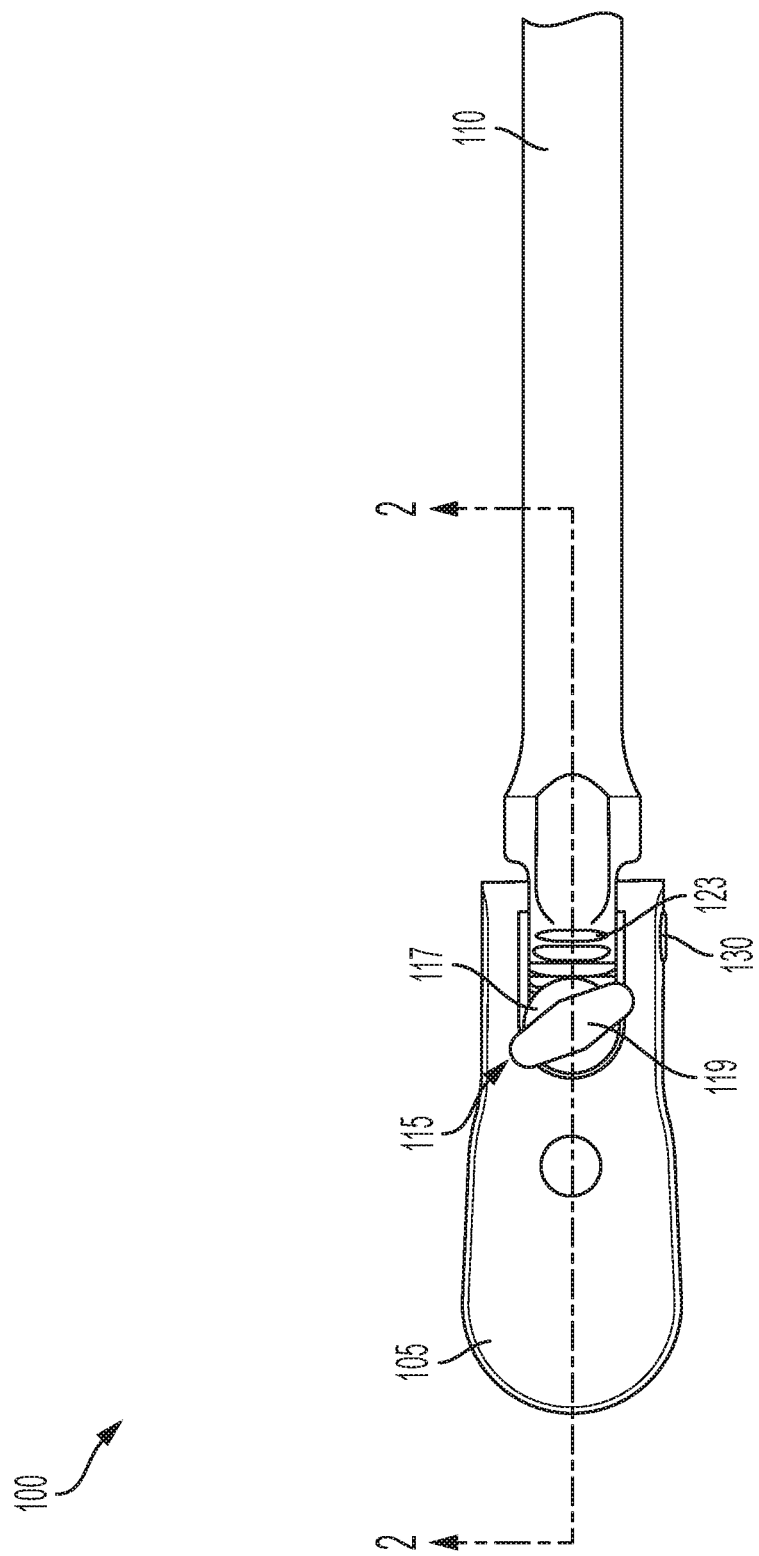
FIG. 1 is a top view of a tool in the engaged position according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a button lock that selectively retains the angle of an object, such as a wrench head, relative to a handle. The button lock is rotatable between engaged and disengaged positions. When the button lock is disposed in the engaged position, button teeth disposed on the button cooperatively engage handle teeth disposed on the handle. When the button lock is disposed in the disengaged position, the button teeth are disengaged from the handle teeth and a clearance portion of the button is then substantially aligned adjacent with the handle teeth to allow free pivotable movement of the handle about the button. In this manner, the button can act as a quick and easy mechanism for selectively retaining a desired angle of the ratchet head relative to the handle.

Referring to FIGS. 1-8B, a tool 100 includes a head 105 pivotably connected to a handle 110 about a button 115. The button 115 includes a button base 117 that acts as a structural backbone of the button 115, and a knob 119 that a user can use as a grip to rotate the button 115 to cause selective engagement of the button 115 against the handle 110, and therefore to retain the angle of the head 105 relative to the handle 110.

As shown, the handle 110 can include handle teeth 123 disposed at an end of the handle 110. The handle teeth 123 can meshingly engage button teeth 127 disposed on the button 115 to prevent pivotal movement of the handle 110 relative to the head 105. The button 115 can also include a clearance portion 129 around a part of the outer circumference that allows the button 115 to be spaced or otherwise disengaged from the handle 110. In an embodiment, the button teeth 115 are grooves that extend around a partial circumference of the button 115, while the clearance portion 129 is a smooth portion that does not engage the handle teeth 123, thereby allowing the button 115 to rotate freely about the handle 110 in the disengaged position. In an embodiment, there are 5 of each of the button teeth 127 and handle teeth 123.

Figure 2:
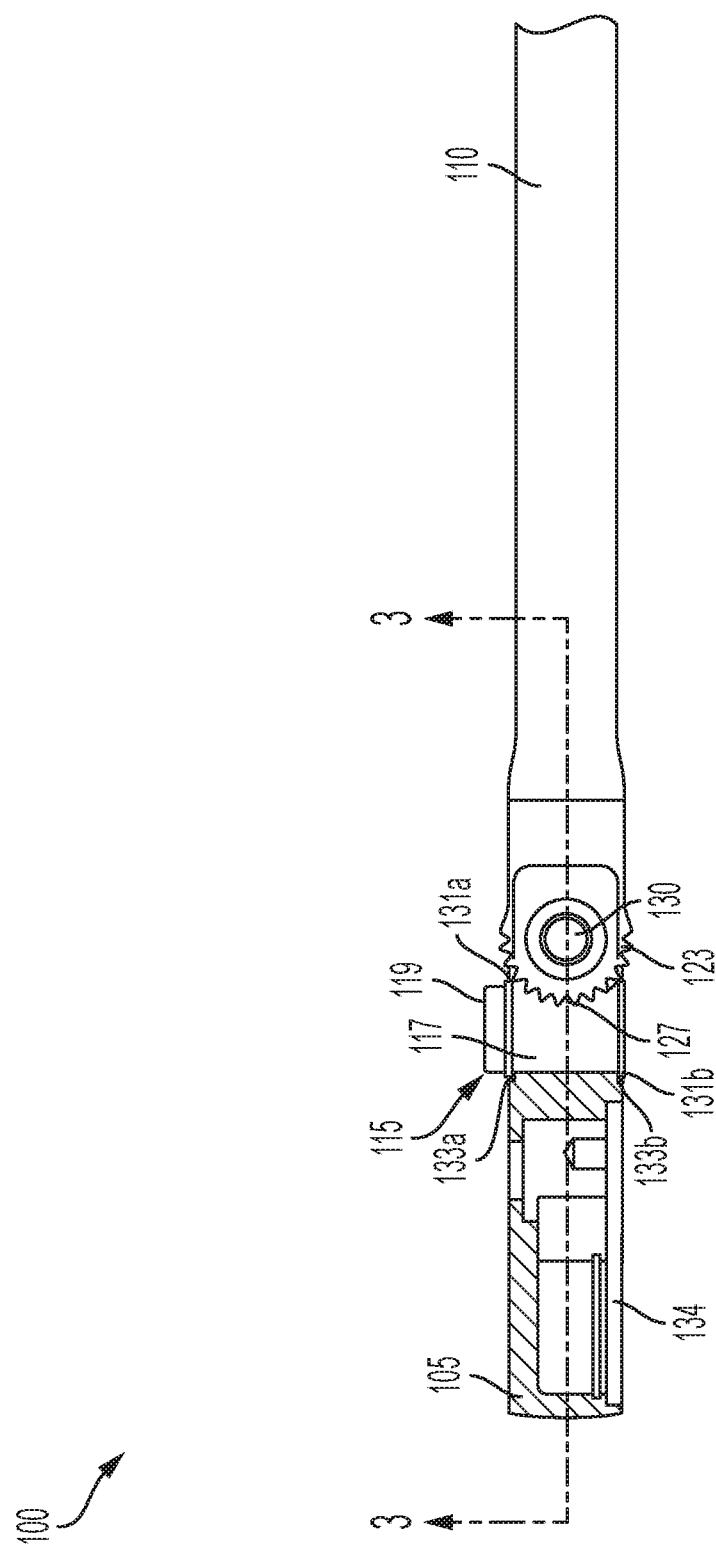
FIG. 2 is a side partial sectional view of the tool as cut along line 2-2 in FIG. 1 according to an embodiment of the present invention.
Figure 3:
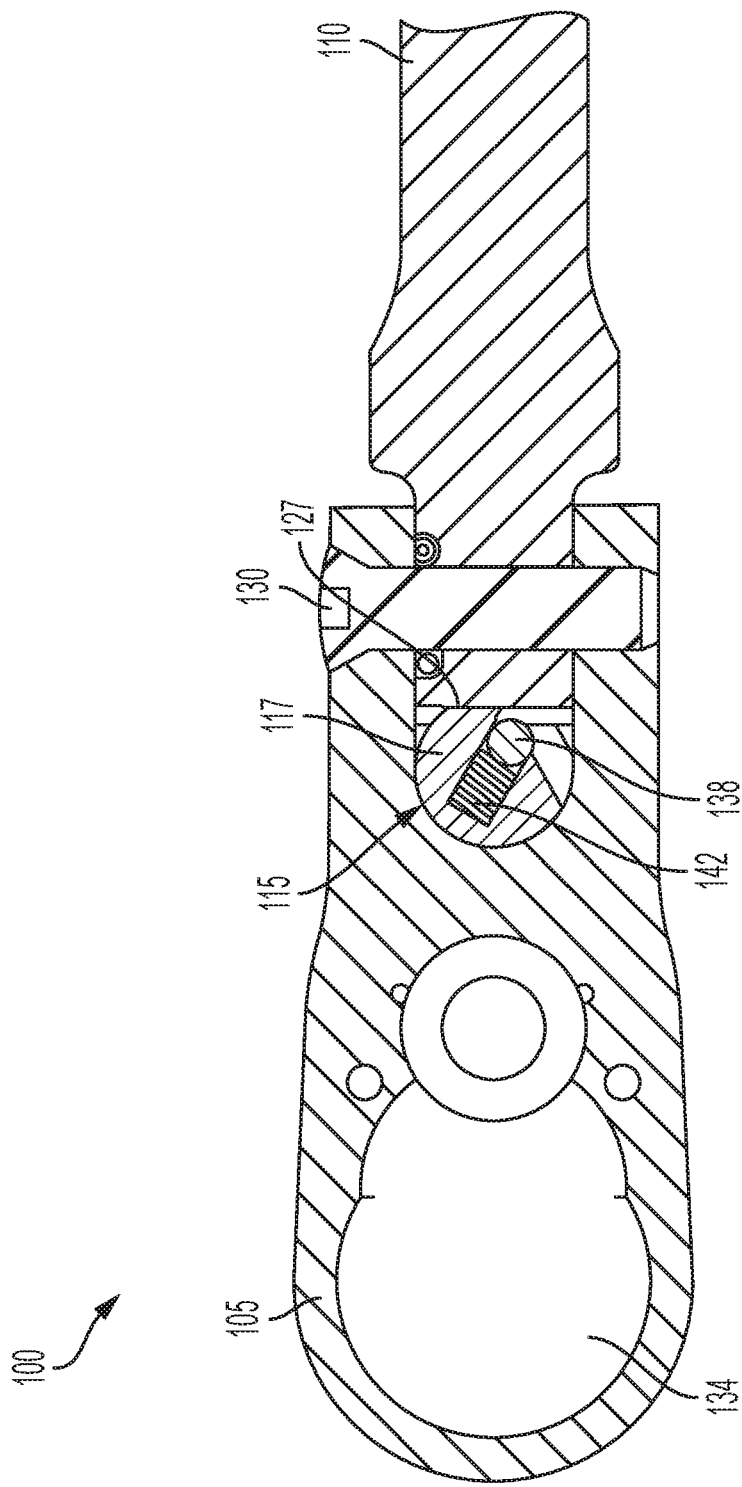
FIG. 3 is a bottom sectional view of the tool as cut along line 3-3 in FIG. 2 according to an embodiment of the present invention.
Figure 4:
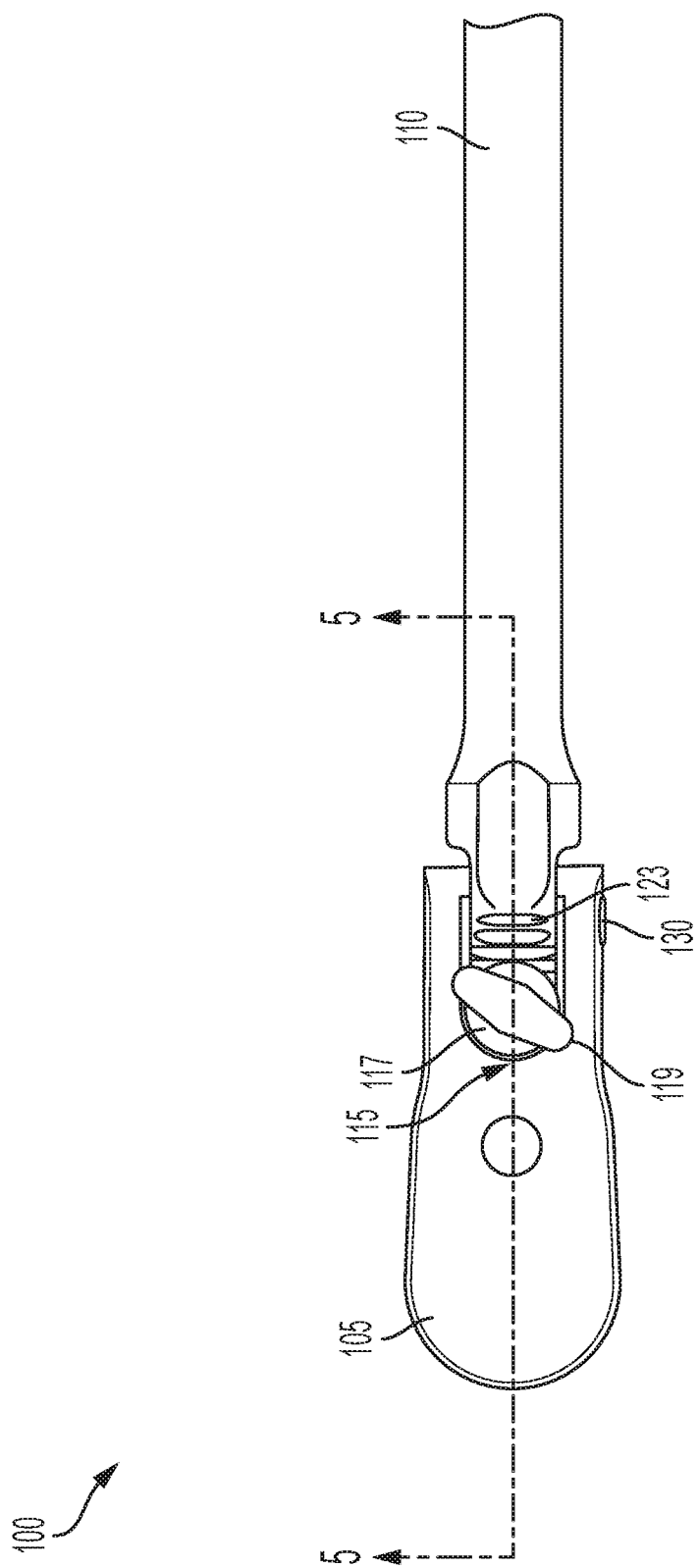
FIG. 4 is a top view of a tool in the disengaged position according to an embodiment of the present invention.
Figure 5:
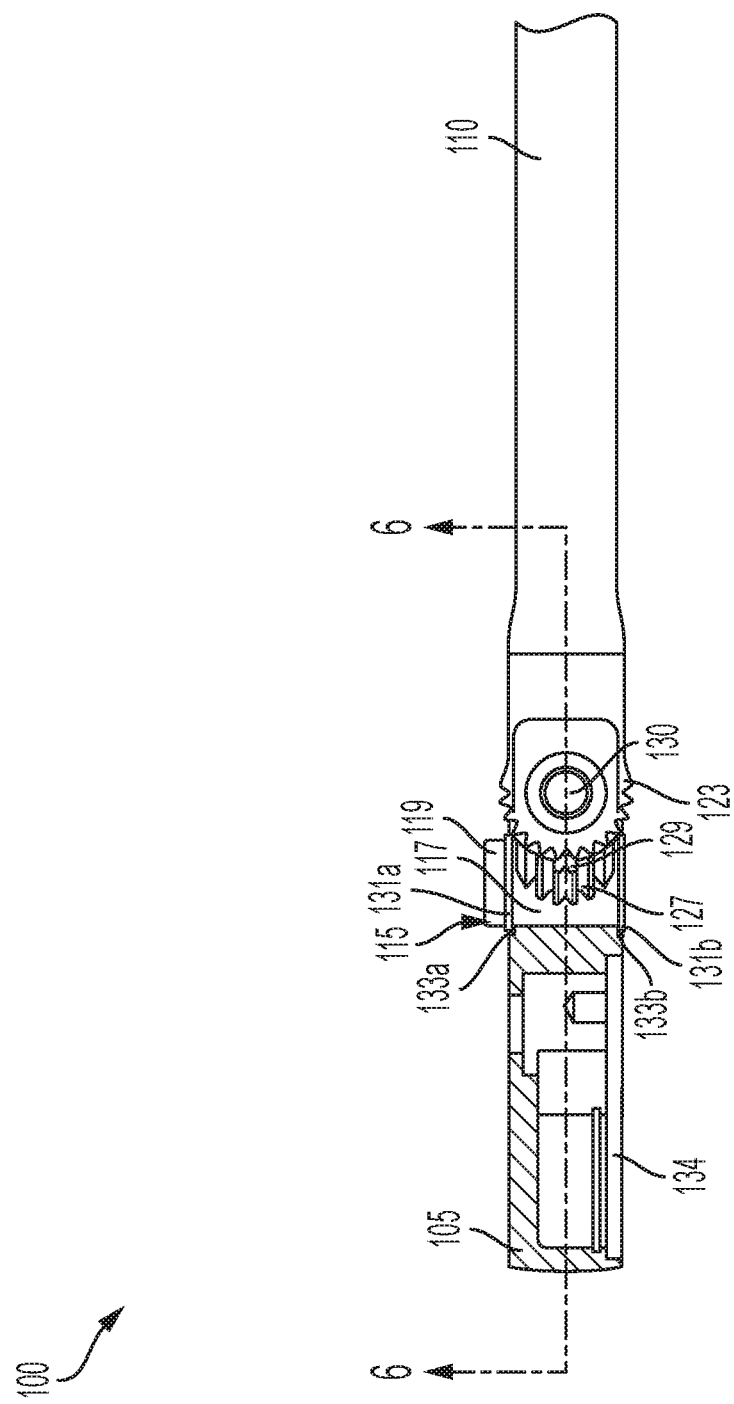
FIG. 5 is a side partial sectional view of the tool as cut along line 5-5 in FIG. 4 according to an embodiment of the present invention.
Figure 6:
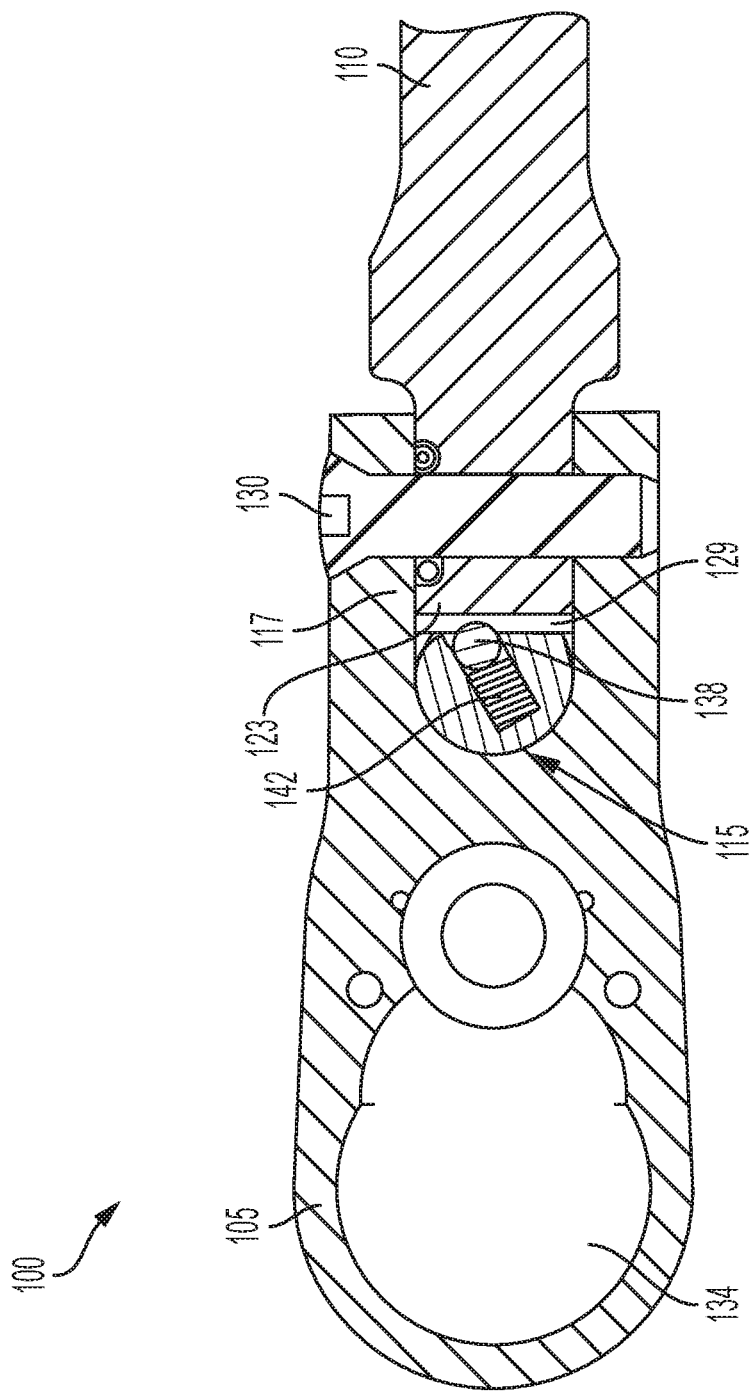
FIG. 6 is a bottom sectional view of the tool as cut along line 6-6 in FIG. 5 according to an embodiment of the present invention.
Figure 7:
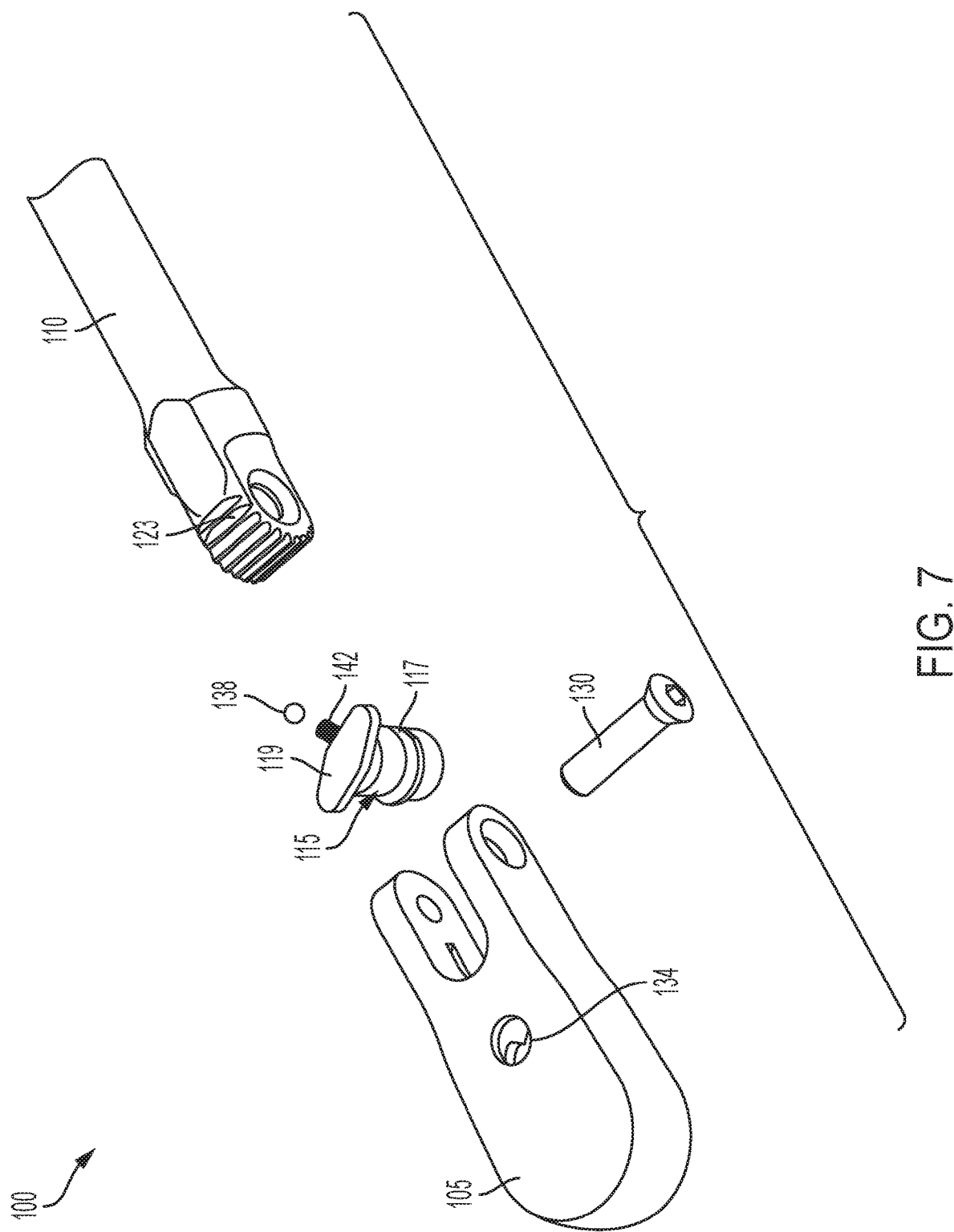
FIG. 7 is a top perspective exploded view of the tool according to an embodiment of the present invention.
Figure 8A:
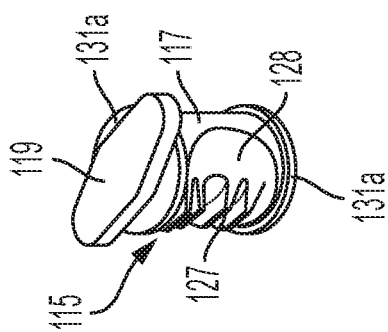
FIG. 8A is a top perspective view of a button according to an embodiment of the present invention.
Figure 8B:
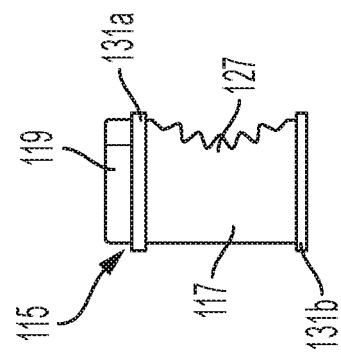
FIG. 8B is a side view of a button according to an embodiment of the present invention.

In an embodiment, a user can rotate the button 115 by gripping the knob 119 and rotating the knob 119 to engage the button teeth 127 against the handle teeth 123 in the engaged position. The button 115 is sized such that rotation of the button 115 causes meshing engagement between the button teeth 127 and the handle teeth 123 when the tool 100 is in the engaged position. For example, the button base 117 can have a circular cross-section with a variable diameter. The diameter of the button base 117 at all or part of the button teeth 127 can be larger than the diameter of the button base 117 at the button clearance 129. The button teeth 127 can therefore engage the handle teeth 123 in the engaged position when the user rotates the button 115 to thereby cause the larger diameter button teeth 127 to engage the handle teeth 123, as shown in FIGS. 2 and 3, for example. In such embodiment, the engagement tolerances between button teeth 127 and handle teeth 123 is minimal to minimize play between the handle 110 and head 105, creating an interference-like fit. The user can then rotate the button 115 into the disengaged position where the clearance portion 129 is adjacent to the handle teeth 123 and, due to the smaller diameter of the clearance portion 129, can be spaced from or otherwise disengaged from the handle teeth 123. In this manner, the button 115 can allow quick and easy retention of the handle 110 about the button 115 and, by extension, the head 105.

The handle 110 is pivotably coupled to the head 105 via a pin 130 that extends perpendicular to an axial direction of the tool 100. For example, and without limitation, the pin 130 can have a pin axis and each of the handle teeth 123 can be a same radial distance from the pin axis. The button 115 can be retained within an opening of the head 105 by virtue of lips 131a, b on the button 115 and ledges 133a, b on the head 105 of the tool 100. For example, the lips 131a, b can extend beyond the outer diameter of the button and the ledges 133a, b can provide a cutout shape for the lips 131a, b to rest within. The lips 131a, b can therefore resist axial movement of the button 115 and prevent the button 115 from being inadvertently removed from the opening in which it sits. The head 105 of the tool 100 can include a cavity 134 for receiving a drive gear, lug, pawl mechanism, reversing lever, and other mechanisms well known in the ratchet wrench art.

In an embodiment, a ball detent mechanism can be provided to provide a tactile indication when rotating the handle 110 about the head 105. For example, and as shown, a positive detent can be provided by a ball detent mechanism that includes a ball 138 and a spring 142 located within a hole of the button 115. The spring 142 can act on the ball 138 so as to engage the handle teeth 123 upon rotation of the handle 110. The ball 138 can ride along the peaks and valleys of the handle teeth 123 to provide a "click" and to therefore inform the user when the handle 110 has been rotated by one tooth.

The present invention h according to an embodiment of the present invention as been described herein as used with hand tools, such as with a flex head ratchet wrench. However, the tool can be used with any object, including other tools and other objects unaffiliated with tools, without departing from the spirit and scope of the present invention. For example, the present invention can retain a screwdriver, non-ratcheted wrench, pliers, or non-tool objects such as dental and medical equipment.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool with a head pivotally coupled to a handle adapted to form an angle between the head and the handle, the tool comprising:
   handle teeth disposed at an end of the handle;
   a button disposed in the head and selectively rotatable between engaged and disengaged positions, the button includes a button base with button teeth disposed around a first part of an outer circumference of the button base and a clearance portion disposed around a second part of the outer circumference of the button base,
   wherein when the button is disposed in the engaged position, the button teeth are engaged with the handle teeth to selectively retain the angle between the head and the handle; and
   a detent member disposed in the button, wherein the detent member is biased towards the handle teeth and adapted to provide a tactile indication when the head is pivoted relative to the handle.

2. The tool of claim 1, wherein the button teeth are disposed at a first diameter along the outer circumference of the button base and the clearance portion is disposed at a second diameter along the outer circumference of the button base, wherein the first diameter is larger than the second diameter.

3. The tool of claim 1, wherein the button teeth are disposed at a first diameter along the outer circumference of the button base and the clearance portion is disposed at a second diameter along the outer circumference of the button base, and when the button is disposed in the disengaged position, the clearance portion is adjacent to the handle teeth and spaced from the handle teeth by a gap and the button teeth are disengaged from the handle teeth.

4. The tool of claim 1, wherein the button teeth are disposed at a first diameter along the outer circumference of the button base and the clearance portion is disposed at a second diameter along the outer circumference of the button base, and when the button is disposed in the disengaged position, the clearance portion is adjacent to the handle teeth and the button teeth are disengaged from the handle teeth.

5. The tool of claim 1, wherein the button includes first and second lips respectively located at first and second axial ends thereof, each of the first and second lips has a lip diameter larger than a button base diameter, and wherein the head includes first and second ledges respectively configured to receive the first and second lips to prevent axial movement of the button when the button is disposed within the head.

6. The tool of claim 1, further comprising a pin pivotably coupling the head to the handle, wherein the pin extends along a pin axis perpendicular to an axial direction of the tool, and wherein the handle teeth are each disposed a same radial distance from the pin axis.

7. The tool of claim 1, wherein the detent member includes a spring and ball disposed in a hole of the button, and the spring biases the ball against the handle teeth to provide the tactile indication when the head is pivoted relative to the handle.

8. A tool comprising:
a handle including handle teeth at an end thereof;
a head pivotably coupled to the handle, adapted to form an angle between the head and the handle;
a button selectively rotatable between engaged and disengaged positions, the button includes a button base with button teeth disposed around a first part of an outer circumference of the button base and a clearance portion disposed around a second part of the outer circumference of the button base,
wherein when the button is disposed in the engaged position, the button teeth engage the handle teeth to selectively retain the angle between the handle and the head, and when the button is disposed in the disengaged position, the clearance portion is adjacent to the handle teeth and the button teeth disengage the handle teeth thereby allowing the head to pivot relative to the handle; and
a detent member disposed in the button, wherein the detent member is biased towards the handle teeth and adapted to provide a tactile indication when the head is pivoted relative to the handle.

9. The tool of claim 8, wherein the button is disposed in the head.

10. The tool of claim 8, wherein the button teeth are disposed at a first diameter along the outer circumference of the button base and the clearance portion is disposed at a second diameter along the outer circumference of the button base, wherein the first diameter is larger than the second diameter.

11. The tool of claim 8, wherein the button teeth are disposed at a first diameter along the outer circumference of the button base and the clearance portion is disposed at a second diameter along the outer circumference of the button base, and when the button is disposed in the disengaged position, the clearance portion is adjacent to the handle teeth and spaced from the handle teeth by a gap, and the button teeth are disengaged from the handle teeth.

12. The tool of claim 8, wherein the button teeth are disposed at a first diameter along the outer circumference of the button base and the clearance portion is disposed at a second diameter along the outer circumference of the button base, and when the button is disposed in the disengaged position, the clearance portion is adjacent to the handle teeth and the button teeth are disengaged from the handle teeth.

13. The tool of claim 9, wherein the button includes first and second lips respectively located at first and second axial ends thereof, each of the first and second lips has a lip diameter larger than a button base diameter, and wherein the head includes first and second ledges respectively configured to receive the first and second lips to prevent axial movement of the button within the head.

14. The tool of claim 8, further comprising a pin pivotably coupling the head to the handle, wherein the pin extends in a pin axis perpendicular to an axial direction of the tool, and wherein the handle teeth are each disposed a same radial distance from the pin axis.

15. The tool of claim 8, wherein the detent member includes a spring and ball disposed in a hole of the button, and the spring biases the ball against the handle teeth to provide the tactile indication when the head is pivoted relative to the handle.

16. A button lock configured to selectively retain an angle between a handle having handle teeth relative to an object, the button lock comprising:
a button base having a circular cross section;
button teeth disposed around a first part of an outer circumference of the button base;
a clearance portion disposed around a second part of the outer circumference of the button base,
wherein the button lock is adapted to selectively rotate between engaged and disengaged positions, and when the button lock is disposed in the engaged position, the button teeth are adapted to be engaged with the handle teeth to selectively retain the angle between the handle and the object; and
a detent member disposed in the button, wherein the detent member is biased towards the handle teeth and adapted to provide a tactile indication when the object is pivoted relative to the handle.

17. The button lock of claim 16, wherein the button teeth are disposed at a first diameter along the outer circumference of the button base and the clearance portion is disposed at a second diameter along the outer circumference of the button base, wherein the first diameter is larger than the second diameter.

18. The button lock of claim 16, wherein the button teeth are disposed at a first diameter along the outer circumference of the button base and the clearance portion is disposed at a second diameter along the outer circumference of the button base, and when the button lock is disposed in the disengaged position, the clearance portion is adapted to be adjacent to the handle teeth and spaced from the handle teeth by a gap.

19. The button lock of claim 16, wherein the button teeth are disposed at a first diameter along the outer circumference of the button base and the clearance portion is disposed at a second diameter along the outer circumference of the button base, and when the button lock is disposed in the disengaged position, the clearance portion is adapted to be adjacent to the handle teeth, and the button teeth are adapted to be disengaged from the handle teeth.

20. The button of claim 16, further comprising first and second lips respectively located at first and second axial ends of the button, each of the first and second lips has a lip diameter larger than a button base diameter, and wherein the first and second lips are configured to be received in first and second ledges of the object to prevent axial movement of the button within the object.

21. A tool with a head pivotally coupled to a handle adapted to form an angle between the head and the handle, the tool comprising:
  handle teeth disposed at an end of the handle;
  a button rotatably disposed in the head, the button includes a button base with button teeth disposed around a first part of an outer circumference of the button base and a clearance portion disposed around a second part of the outer circumference of the button base,
  wherein the button teeth are selectively engageable with the handle teeth to selectively retain the angle between the head and the handle;
  a pin pivotably coupling the head to the handle, wherein the pin extends along a pin axis perpendicular to an axial direction of the tool, and the handle pivots around the pin axis; and
  a detent member disposed in the button, wherein the detent member is biased towards the handle teeth and adapted to provide a tactile indication when the head is pivoted relative to the handle.

22. The tool of claim 21, wherein the button teeth are disposed at a first diameter along the outer circumference of the button base and the clearance portion is disposed at a second diameter along the outer circumference of the button base, wherein the first diameter is larger than the second diameter.

23. The tool of claim 21, wherein the button teeth are disposed at a first diameter along the outer circumference of the button base and the clearance portion is disposed at a second diameter along the outer circumference of the button base, and wherein the clearance portion is spaced from the handle teeth by a gap and the button teeth are disengaged from the handle teeth when the clearance portion is adjacent to the handle teeth.

24. The tool of claim 21, wherein the button teeth are disposed at a first diameter along the outer circumference of the button base and the clearance portion is disposed at a second diameter along the outer circumference of the button base, and wherein the button teeth are disengaged from the handle teeth when the clearance portion is adjacent to the handle teeth.

25. The tool of claim 21, wherein the button includes first and second lips respectively located at first and second axial ends thereof, each of the first and second lips has a lip diameter larger than a button base diameter, and wherein the head includes first and second ledges respectively configured to receive the first and second lips to prevent axial movement of the button when the button is disposed within the head.

26. The tool of claim 21, wherein the handle teeth are each disposed a same radial distance from the pin axis.

27. The tool of claim 21, wherein the detent member includes a spring and ball disposed in a hole of the button, and the spring biases the ball against the handle teeth to provide the tactile indication when the head is pivoted relative to the handle.

\* \* \* \* \*